United States Patent
Forsman et al.

(10) Patent No.: US 6,205,414 B1
(45) Date of Patent: Mar. 20, 2001

(54) METHODOLOGY FOR EMULATION OF MULTI-THREADED PROCESSES IN A SINGLE-THREADED OPERATING SYSTEM

(75) Inventors: Stephanie Maria Forsman, Rochester, MN (US); Rick Allen Hamilton, II; Chetan Mehta, both of Austin, TX (US); Maulin Ishwarbhai Patel, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,953

(22) Filed: Oct. 2, 1998

(51) Int. Cl.$^7$ ............................................. G06F 9/455
(52) U.S. Cl. ................................. 703/26; 703/26
(58) Field of Search .................................. 703/26

(56) References Cited

U.S. PATENT DOCUMENTS

| | | | |
|---|---|---|---|
| 5,377,191 | * 12/1994 | Farrell et al. | 370/401 |
| 5,410,681 | * 4/1995 | Jessen et al. | 395/500.48 |
| 5,452,459 | * 9/1995 | Drury et al. | 707/2 |
| 5,504,898 | * 4/1996 | Klein | 709/101 |
| 5,784,613 | * 7/1998 | Tamirisa | 709/100 |
| 5,901,312 | * 5/1999 | Radko | 709/104 |
| 5,930,509 | * 7/1999 | Yates et al. | 395/500.707 |
| 5,953,516 | * 9/1999 | Bonola | 395/500.45 |

OTHER PUBLICATIONS

Generic Unix Off–Level Interrupt Handling Invocation Algorithm, IBM Technical Disclosure Bulletin, vol. 33 No. 9, Feb. 1991, pp. 446–447.

Portable Co–Operative Multi–Threading Via Modified Procedural Cell, IBM Technical Disclosure Bulletin, vol. 37, No. 10, Oct. 1994, pp. 283–284.

* cited by examiner

*Primary Examiner*—Kevin J. Teska
*Assistant Examiner*—Hugh Jones
(74) *Attorney, Agent, or Firm*—Leslie A. VanLeeuwen; Felsman, Bradley, Vaden, Gunter & Dillon, LLP

(57) ABSTRACT

To emulate multi-threaded processing in an operating system supporting only single-threaded processes and single-level interrupts, the processor timer is started with a selected time-out period during execution of a master code thread. Processing of the master code thread proceeds until the timer interrupt, at which time the operating system timer interrupt service routine (ISR) transfers execution control to a slave code thread or slave code thread component. The slave code thread or component is executed in its entirety, at which time the timer is reset and execution control is returned to the master code thread, where processing resumes at the point during which the timer interrupt was asserted. To minimize disruption of the master code thread execution, a maximum latency should be enforced on the slave code thread, which may be accomplished by breaking the slave code thread into multiple components. The timer ISR maintains an index of the predetermined starting points within the slave code thread(s) with a pointer identifying the next slave code thread component to be selected when the timer interrupt is asserted. Processing thus alternates between the master code thread and the slave code thread or components, with different slave code thread components being selected in round-robin fashion. The duty cycle between the master code thread and the slave code thread or components may be varied by selection of the time-out period and the maximum latency allowed to slave code thread processing.

16 Claims, 4 Drawing Sheets

METHODOLOGY FOR EMULATION OF MULTI-THREADED PROCESSES IN A SINGLE-THREADED OPERATING SYSTEM

BACKGROUND OF THE INVENTION

1. Technical Field

The present invention relates in general to multi-threaded processes in data processing systems utilizing low-end, commodity processors and in particular to emulation of multi-threaded processes in single-threaded operating systems through timer routine interrupts. Still more particularly, the present invention relates to emulating multi-threaded processes in single-thread, single level interrupt operating systems by configuration of a timer interrupt to switch between processes.

2. Description of the Related Art

In many contemporary microprocessor environments, such as those found in consumer electronics, automotive electronics, and industrial controllers, the operating system permits only a single-threaded process. These operating systems are inexpensive since the code for the operating system is relatively easy to implement. By definition, single-threaded processes allow execution only within a single, contiguous code body where operation is strictly sequential. The sequential operation in such an environment typically involves a short, transient flow of one-time operations followed by code looping, where the execution logic continuously polls the state of various external parameters and takes action according to the parameter values.

One problem which occurs is that the need to pursue multi-threaded operations often arises within such an environment after functionality has been developed for a single-threaded operating system. Such needs are normally dealt with either by moving to a multi-threaded operating system and rewriting code for the new operating system or rewriting the single-threaded code body to include the new functionality by recursive calls within the single-threaded limitation. Both approaches require substantial effort in the form of extensive testing to ensure that the desired functionality remains intact. This may not be warranted where the need for true multi-tasking is not required, merely the need to expand the functionality of commodity processors.

It would be desirable, therefore, to provide a system for emulating multi-threaded processes in a single-threaded operating system supporting only single level interrupts.

SUMMARY OF THE INVENTION

It is therefore one object of the present invention to provide an improved method and system for implementing multi-threaded processes in data processing systems utilizing low-end, commodity processors.

It is another object of the present invention to provide a method and system for emulation of multi-threaded processes in single-threaded operating systems through timer routine interrupts.

It is yet another object of the present invention to provide a method and system for emulating multi-threaded processes in single-thread, single level interrupt operating systems by configuration of a timer interrupt to switch between processes.

The foregoing objects are achieved as is now described. To emulate multi-threaded processing in an operating system supporting only single-threaded processes and single-level interrupts, the processor timer is started with a selected time-out period during execution of a master code thread. Processing of the master code thread proceeds until the timer interrupt, at which time the operating system timer interrupt service routine (ISR) transfers execution control to a slave code thread or slave code thread component. The slave code thread or component is executed in its entirety, at which time the timer is reset and execution control is returned to the master code thread, where processing resumes at the point during which the timer interrupt was asserted. To minimize disruption of the master code thread execution, a maximum latency should be enforced on the slave code thread, which may be accomplished by breaking the slave code thread into multiple components. The timer ISR maintains an index of the predetermined starting points within the slave code thread(s) with a pointer identifying the next slave code thread component to be selected when the timer interrupt is asserted. Processing thus alternates between the master code thread and the slave code thread or components, with different slave code thread components being selected in round-robin fashion. The duty cycle between the master code thread and the slave code thread or components may be varied by selection of the time-out period and the maximum latency allowed to slave code thread processing.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
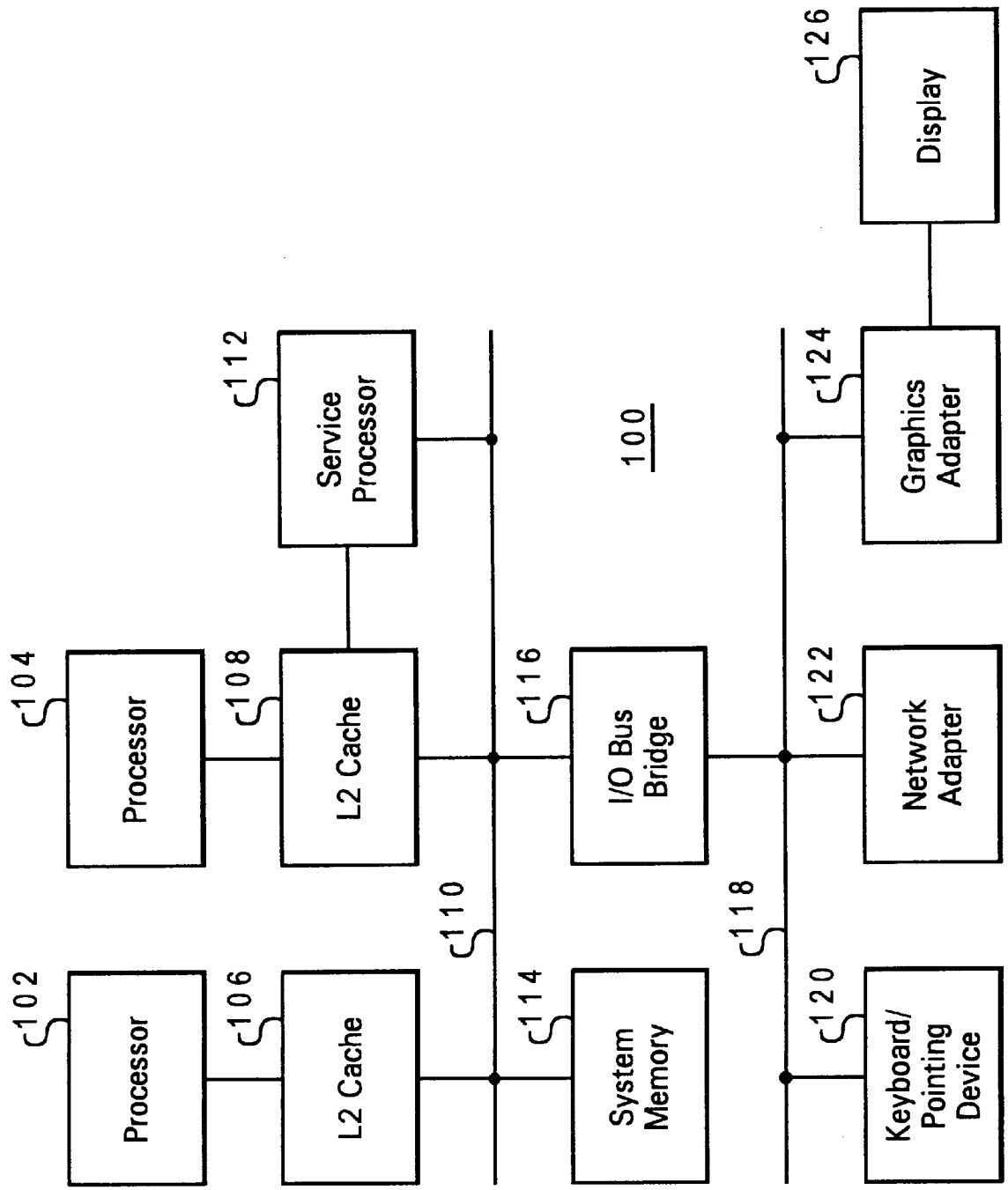
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 includes processors 102 and 104 each connected to a level two (L2) cache 106 and 108, respectively, which are connected in turn to a system bus 110. Data processing system 100 is accordingly a symmetric multi-processor (SMP) system of the type known in the art.

Data processing system 100 also includes a service processor 112 connected to system bus 110 which operates independently and may operate even if the main system is down. Service processor 112 may offer integrated system environmental monitoring/alerting functions such as AC/DC voltage, fan speed, and temperature sensing. Service processor 112 may also provide early power of warnings and have facilities for error log analysis and alerts.

Also connected to system bus 110 are system memory 114 and input/output (I/O) bus bridge 116. I/O bus bridge 116 connects system bus 110 to I/O bus 118, and enables data transactions between the two buses. Connected to I/O bus 118 may be a keyboard and/or pointing device 120, a network adapter 122, and a graphics adapter 124 coupling the I/O bus 118 to a display 124.

The operation of data processing systems of the type depicted in FIG. 1 are well known in the art, as are the numerous possible variations to the components and configuration depicted. Such variations are believed to be within the spirit and scope of the present invention.

Service processor 112 in the present invention executes a single-threaded operating system. A primary application process executed by service processor 112 on this single-threaded operating system is checking various parameters described above (AC/DC voltage, fan speed, and temperature). However, the need to introduce radically different application processes, such as heartbeat surveillance or a "display character" process (for displaying of transient progress indicators on the operator panel), may also arise. The need for emulating multi-threaded application processes thus arises, and is solved utilizing the timer interrupt service routine as described in further detail below.

Figure 2:
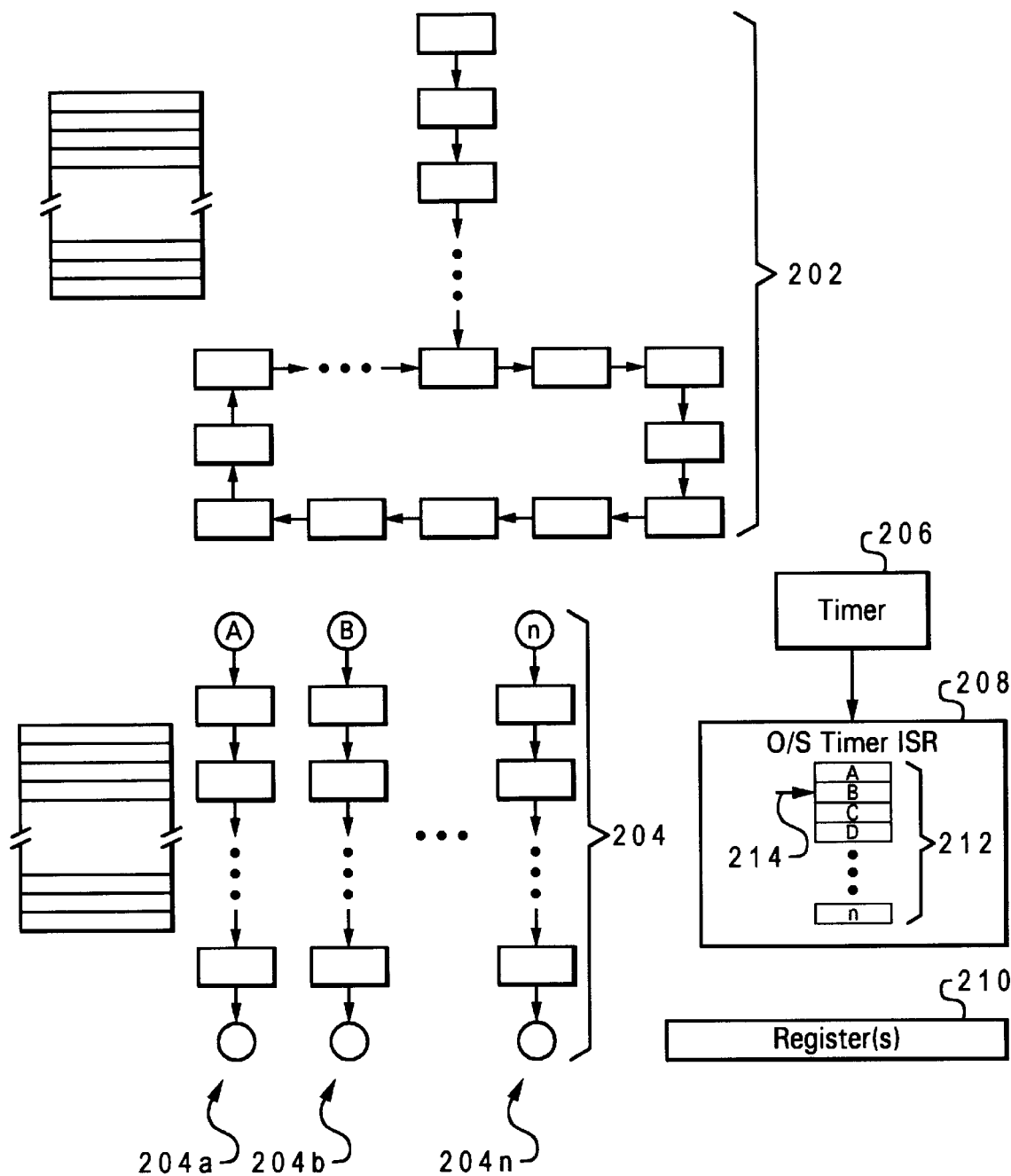
FIG. 2 is a diagram of a system for emulating multi-threaded processes in a single-threaded operating system supporting single-level interrupts in accordance with a preferred embodiment of the present invention.

Referring to FIG. 2, a diagram of a system for emulating multi-threaded processes in a single-threaded operating system supporting single-level interrupts in accordance with a preferred embodiment of the present invention is illustrated. System 200 includes a master code thread 202 and a slave code thread 204. "Master code thread," as used herein, refers to a mainline, continuous process corresponding to one body of executable code which is to be executed on the single-threaded operating system. "Slave code thread" refers to a secondary process which needs to be accessed upon occasion, but which corresponds to a separate executable code body resident within a different compilation area, stored either on the same or a different storage medium. The two code bodies and the corresponding process threads are not written to be executed concurrently or in parallel, nor is the underlying operating system designed to switch between multiple threads for parallel execution.

In order to emulate multi-threaded process execution, the timer interrupt service routine is employed to bridge the boundary between the two distinct code bodies and their corresponding processes. Master code thread 202 is first executed, and implements a timer function—that is, master code thread includes an instruction starting the service processor's timer 206. The instruction may also define the time-out period at which timer 206 by selecting a number of clock cycles to be counted by timer 206. Processing proceeds within master code thread 202 until the time-out period elapses (e.g., timer 206 expires).

In accordance with conventional interrupt handling, when the timer interrupt "pops" (is asserted), the current state of the master code thread process 202 is saved in one or more register(s) 210. In the present invention, however, the operating system's (OS) timer interrupt service routine (ISR) 208 is configured to pass execution control to slave code thread 204 upon expiration of the time-out period. Slave code thread 204 is processed to accomplish the associated functionality during the interrupt processing. Once execution of the slave code routine is complete, timer 206 is reset and execution control is returned by the timer ISR 208 to master code thread 202 at the point at which processing was interrupted. In this manner, processing periodically alternates between master code thread 202 and slave code thread 204.

To ensure minimal disruption during execution of master code thread 202, certain guarantees of maximum latency, or of maximum imposed delay, should be enforce upon processing of slave code thread 204. For this purpose, slave code thread 204 may be broken into a number of components 204*a*–204*n*. Components 204*a*–204*n* may correlate to portions of the overall slave code thread 204, with the timer ISR 208 invoking execution from various predetermined points within slave code thread 204. Alternatively, components 204*a*–204*n* may correlate to multiple slave code threads, each corresponding to a different executable code body in a distinct compilation area for different secondary processes each requiring periodic access.

Timer ISR 208 includes a circular index 212 of the points at which execution of components 204*a*–204*n* is to be invoked, with a pointer 214 indicating the next component to be invoked by timer ISR 208 upon expiration of the time-out period. Each time processing of a slave code thread component is completed, timer ISR 208 advances pointer 214 before resetting timer 206 and returning execution control to master code thread 202. In this fashion, execution of the various slave code thread components 204*a*–204*n* occurs in round-robin fashion with each timer interrupt.

Use of multiple slave code thread components 204*a*–204*n* allows control of the latency introduced into execution of master code thread 202 by switching processing to slave code thread 204. Each component 204*a*–204*n* may be constrained to either a predetermined number of instructions or to sets of instructions consuming a predetermined number of processor cycles for execution. The latency of components 204*a*–204*n* may thus be balanced with the time-out period selected for timer 206 to achieve a desired duty-cycle (e.g., 65%–35%) between processing of master code thread 202 and slave code thread 204.

While use of timer interrupts to switch between processes is generally known in the art, such prior use typically involves interrupting an application process to service an operating system process, some process integrated into the operating system. These uses do not include use of the timer interrupt to alternate between two or more application processes, each running on top of the operating system.

Figure 3A:
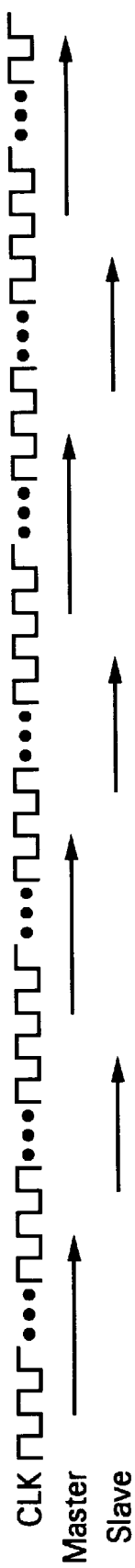
FIGS. 3A–3B depict timing diagrams showing emulation of multi-threaded processing during execution of master and slave code threads in accordance with a preferred embodiment of the present invention.
Figure 3B:
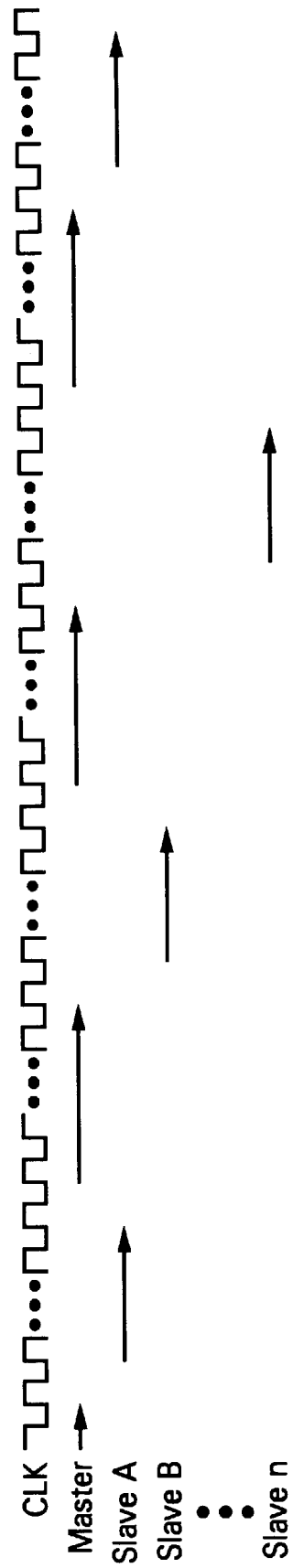

With reference now to FIG. 3A–3B, timing diagrams showing emulation of multi-threaded processing during execution of master and slave code threads in accordance with a preferred embodiment of the present invention are depicted. FIG. 3A shows processing alternating between a single master code thread and a single slave code thread. The duty cycle between the number of clocks allocated to the master code thread and the number of clocks allocated to the slave code thread is controlled by the time-out period of the timer and the maximum latency enforced on the slave code thread. A few clock cycles may be consumed each time processing is switched between master and slave code threads by the interrupt service routine, which must save the state of the master code thread processing, if necessary, reset the timer, etc. FIG. 3B depicts processing alternating between a single master code thread and a slave code thread component selected, in round-robin fashion, from a group of n slave code thread components.

Figure 4:
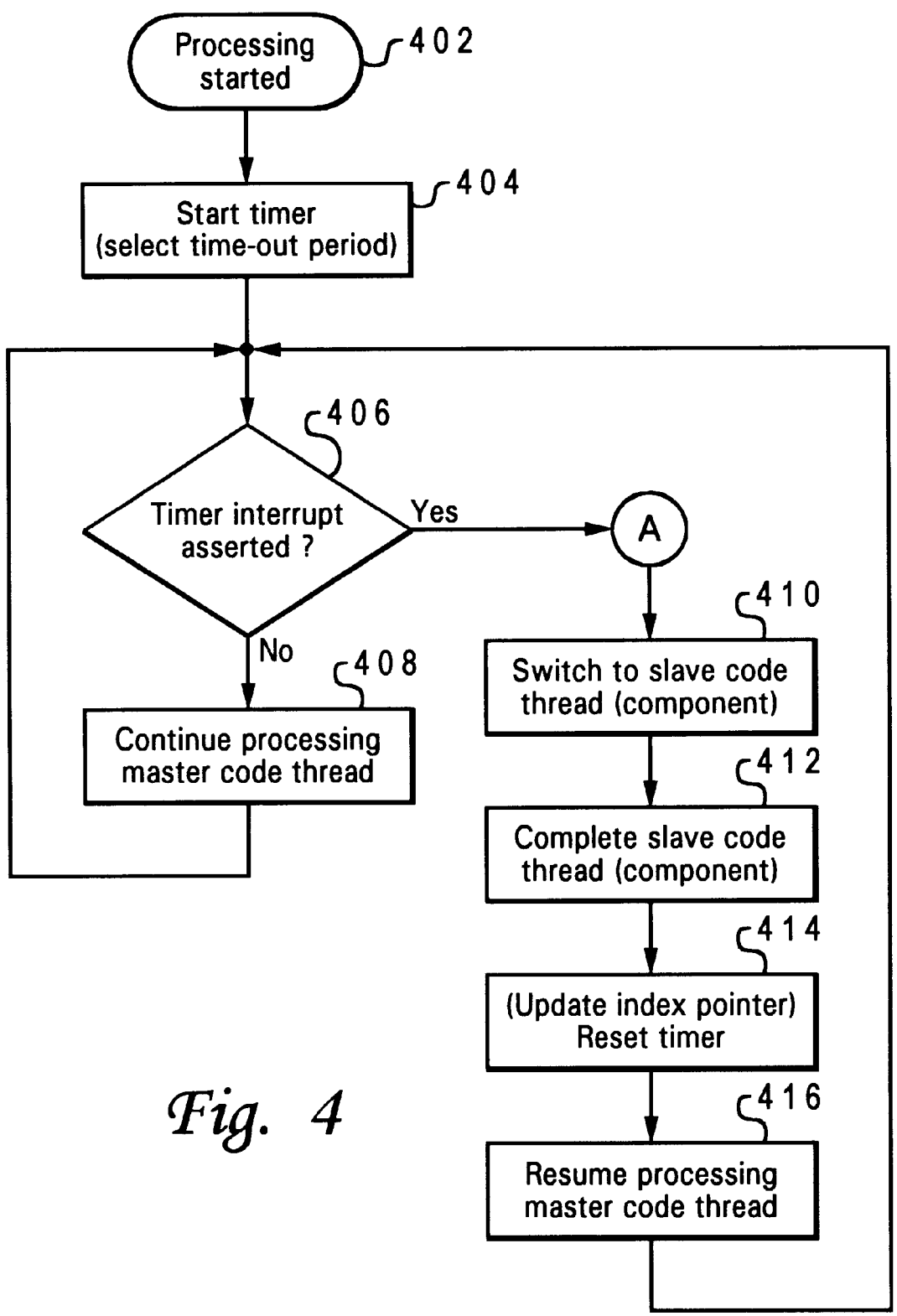
FIG. 4 is a high level flowchart for master code thread, slave code thread, and interrupt processing to emulate multi-threaded processes in accordance with a preferred embodiment of the present invention.

Referring to FIG. 4, a high level flowchart for master code thread, slave code thread, and interrupt processing to emulate multi-threaded processes in accordance with a preferred embodiment of the present invention are illustrated. The process begins at step 402, which depicts the start of processing, beginning with processing of the master code thread. The process then passes to step 404, which illustrates starting the processor timer and optionally selecting a time-out period.

The process passes next to step 406, which depicts a determination of whether the timer interrupt has been asserted. If not, the process proceeds to step 408, which illustrates continuing processing of the master code thread. If so, however, the process proceeds instead to step 410, which depicts switching to a slave code thread or slave code thread component. At this point, the state of the master code thread processing may be saved for later restoration.

The process next passes to step 412, which illustrates completely processing the slave code thread or component, and then to step 414, which depicts optionally updating the index pointer to identify a different slave code thread or component and resetting the processor timer. The process then passes to step 416, which illustrates resuming processing of the master code thread, and then returns to step 406, described above.

Utilizing the methodology of the present invention allows separate and disparate code bodies to be tied together and executed concurrently. The underlying, single-threaded operating system remains essentially intact. The workload and expense for merging single-threaded functionality into a simulated multi-threaded environment is thus substantially reduced.

Previous solutions would either (a) introduce inefficiencies within the code operation and incur significant workload by attempting to insert a secondary code thread's functionality into processing of the primary thread, or (b) required significant expense and workload to port any existing code for the primary and secondary thread processes to a multi-threaded operating system. The former approach, in addition to time, effort and expense, would be difficult since latency between calls to "slave" functionality must often be determined empirically but would be challenging to measure. The latter approach requires an effort in porting code which is easily an order of magnitude greater than the approach of the present invention.

While the exemplary embodiment utilizes a timer interrupt, other interrupts may be similarly employed. For instance, a keyboard interrupt may be utilized to switch between master and slave code thread processing so that a displayed progress indicator is updated only when a operator strikes a certain key.

While the exemplary embodiment has been described in the context of a service processor for a high-end, multi-processor system, the present invention may be advantageously employed in any environment where a commodity processor executing a single-thread operating system is employed. The previously-mentioned examples of consumer electronics, automotive electronics, and industrial controllers are particularly apt candidates for multi-threaded process emulation utilizing the present invention.

It is important to note that while the present invention has been described in the context of a fully functional device, those skilled in the art will appreciate that the mechanism of the present invention and/or aspects thereof are capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of executing multiple processes, comprising:
   starting a timer generating a timer interrupt;
   fully executing an initial portion of a first application process within a single-threaded execution environment, and then beginning execution of a continuous loop portion of the first application process;
   responsive to the timer interrupt being asserted,
      suspending execution of the continuous loop portion of the first application process,
      selecting a secondary application process identified by an index pointer within an ordered sequence of a plurality of secondary application processes, and
      executing a second application process within the single-threaded execution environment to completion;
   updating the index pointer to identify a next secondary application process within the sequence;
   resetting the timer;
   resuming execution of the continuous loop portion of the first application process; and
   responsive to the timer interrupt being again asserted, suspending execution of the continuous loop portion of the first application process and executing the next secondary application process to completion.

2. A method of executing multiple processes, comprising:
   (a) configuring a timer interrupt service routine for a single-threaded operating system on top of which an application corresponding to a master code thread is executed to selectively execute, upon assertion of a timer interrupt, at least one secondary code thread corresponding to an application running on top of the single-threaded operating system, wherein the at least one secondary code thread is distinct from the master code thread;
   (b) starting a timer generating the timer interrupt;
   (c) executing the master code thread;
   (d) responsive to the timer interrupt being asserted, suspending execution of the master code thread and executing the at least one secondary code thread to completion;
   (e) resetting the timer;
   (f) resuming execution of the master code thread; and
   (g) repeating steps (d)–(f).

3. The method of claim 2, wherein the step of suspending execution of the master code thread and executing the at least one secondary code thread to completion further comprises:
   suspending execution of a continuous loop portion of the master code thread;
   selecting a secondary code thread from a plurality of secondary code threads identified by a index pointer rotating through a repetitive, ordered sequence of the plurality of secondary code threads;

executing the selected secondary code thread to completion; and updating the index pointer to identify a next secondary code thread within the ordered sequence.

4. The method of claim 2, further comprising:

repetitively alternating between execution of the master code thread and execution of a secondary code thread selected in round-robin fashion from a plurality of secondary code threads.

5. The method of claim 2, wherein the step of suspending execution of the master code thread and executing the at least one secondary code thread to completion further comprises:

saving a state of execution of the master code thread prior to beginning execution of the at least one secondary code thread.

6. The method of claim 2, wherein the step of resuming execution of the master code thread further comprises:

resuming execution of the master code thread from a point at which the timer interrupt was asserted.

7. A mechanism for executing multiple processes, comprising:

a timer interrupt service routine for a single-threaded operating system on top of which an application corresponding to a master code thread is executed, wherein the timer interrupt service routine identifies at least one secondary code thread to be selectively executed upon assertion of a timer interrupt, wherein the at least one secondary code thread is distinct from the master code thread and corresponds to a second application running on top of the single-threaded operating system;

means for starting a timer generating the timer interrupt;

means for executing the master code thread;

means, responsive to the timer interrupt being again asserted, for suspending execution of the master code thread and executing the at least one secondary code thread to completion;

means for resetting the timer; and means for resuming execution of the master code thread.

8. The mechanism of claim 7, wherein the means for suspending execution of the master code thread and executing the at least one secondary code thread to completion further comprises:

means for suspending a continuous loop portion of the master code thread;

means for selecting a secondary code thread from a plurality of secondary code threads identified by a index pointer rotating through a repetitive, ordered sequence of the plurality of secondary code threads;

means for executing the selected secondary code thread to completion; and means for updating the index pointer to identify a next secondary code thread within the ordered sequence.

9. The mechanism of claim 7, further comprising:

means for repetitively alternating between execution of the master code thread and execution of a secondary code thread selected in round-robin fashion from a plurality of secondary code threads.

10. The mechanism of claim 7, wherein the means for suspending execution of the master code thread and executing the at least one secondary code thread to completion further comprises:

means for saving a state of execution of the master code thread prior to beginning execution of the at least one secondary code thread.

11. The mechanism of claim 7, wherein the means for resuming execution of the master code thread further comprises:

means for resuming execution of the master code thread from a point at which the timer interrupt was asserted.

12. A computer program product within a computer usable medium, comprising:

instructions establishing a timer interrupt service routine for a single-threaded operating system on top of which an application corresponding to a master code thread is executed, wherein the timer interrupt service routine identifies at least one secondary code thread to be selectively executed upon assertion of a timer interrupt, wherein the at least one secondary code thread is distinct from the master code thread and corresponds to a second application running on top of the single-threaded operating system;

instructions for starting a timer generating the timer interrupt;

instructions for executing the master code thread;

instructions, responsive to the timer interrupt being again asserted, for suspending execution of the master code thread and executing the at least one secondary code thread to completion;

instructions for resetting the timer; and instructions for resuming execution of the master code thread.

13. The computer program product of claim 12, wherein the instructions for suspending execution of the master code thread and executing the at least one secondary code thread to completion further comprise:

instructions for suspending a continuous loop portion of the master code thread;

instructions for selecting a secondary code thread from a plurality of secondary code threads identified by a index pointer rotating through a repetitive, ordered sequence of the plurality of secondary code threads;

instructions for executing the selected secondary code thread to completion; and instructions for updating the index pointer to identify a next secondary code thread within the ordered sequence.

14. The computer program product of claim 12, further comprising:

instructions for repetitively alternating between execution of the master code thread and execution of a secondary code thread selected in round-robin fashion from a plurality of secondary code threads.

15. The computer program product of claim 14, wherein the instructions for suspending execution of the master code thread and executing the at least one secondary code thread to completion further comprise:

instructions for saving a state of execution of the master code thread prior to beginning execution of the at least one secondary code thread.

16. The computer program product of claim 15, wherein the means for resuming execution of the master code thread further comprise:

instructions resuming execution of the master code thread from a point at which the timer interrupt was asserted.

* * * * *